United States Patent
Zhang et al.

(10) Patent No.: US 11,984,809 B2
(45) Date of Patent: May 14, 2024

(54) CCM-BASED FLY-BACK SWITCHING POWER SUPPLY CIRCUIT AND CONTROL METHOD THEREOF

(71) Applicant: LII SEMICONDUCTOR CO., LTD., Suzhou (CN)

(72) Inventors: Jie Zhang, Suzhou (CN); Min Zhu, Suzhou (CN); Fulong Wang, Suzhou (CN)

(73) Assignee: LII SEMICONDUCTOR CO., LTD., Suzhou (CN)

( * ) Notice: Subject to any disclaimer, the term of this patent is extended or adjusted under 35 U.S.C. 154(b) by 251 days.

(21) Appl. No.: 17/773,602

(22) PCT Filed: Dec. 21, 2020

(86) PCT No.: PCT/CN2020/138083
§ 371 (c)(1),
(2) Date: Apr. 30, 2022

(87) PCT Pub. No.: WO2022/036971
PCT Pub. Date: Feb. 24, 2022

(65) Prior Publication Data
US 2022/0385192 A1 Dec. 1, 2022

(30) Foreign Application Priority Data
Aug. 17, 2020 (CN) .......................... 202010827437.8

(51) Int. Cl.
*H02M 3/335* (2006.01)
*H02H 7/12* (2006.01)

(52) U.S. Cl.
CPC ...... *H02M 3/33507* (2013.01); *H02H 7/1213* (2013.01)

(58) Field of Classification Search
CPC ............ H02M 3/33507; H02M 1/0009; H02H 7/1213
See application file for complete search history.

(56) References Cited

U.S. PATENT DOCUMENTS

| | | | |
|---|---|---|---|
| 2013/0057173 A1* | 3/2013 | Yao | H05B 45/3725 315/223 |
| 2014/0078790 A1* | 3/2014 | Lin | H02M 3/33507 363/21.16 |
| 2016/0373011 A1 | 12/2016 | Kawashima | |

FOREIGN PATENT DOCUMENTS

| | | |
|---|---|---|
| CN | 106054995 A | 10/2016 |
| CN | 107154723 A | 9/2017 |

(Continued)

OTHER PUBLICATIONS

Hanjing Dong et al. "A New Primary PWM Control Strategy for CCM Synchronous Rectification Flyback Converter" IEEE Transactions on Power Electronics, vol. 35, No. 5, Oct. 2, 2019, pp. 4457-4461.

*Primary Examiner* — Adolf D Berhane
*Assistant Examiner* — Afework S Demisse
(74) *Attorney, Agent, or Firm* — SZDC Law PC

(57) ABSTRACT

A CCM-based fly-back switching power supply circuit includes: a constant current control circuit, a sampling circuit and a peak current control circuit, wherein a sampling circuit is configured to sample the ON-time of the secondary coil to obtain its duty cycle signal D_SEC, and send the signal to a constant current control circuit; a constant current control circuit is configured to receive the duty cycle signal D_SEC, generate a voltage signal CAC from the duty cycle signal D_SEC and the preset reference voltage signal VREF, convert the voltage signal CAC and the peak current control signal VCST from the peak current control circuit into time signals, and conform a comparison on the time signals to (Continued)

output an adjustment signal CCOUT which is used to initiatively adjust the value of the peak current control signal VCST to cause the fly-back switching power supply circuit output a constant current.

8 Claims, 2 Drawing Sheets

(56) References Cited

FOREIGN PATENT DOCUMENTS

| | | | |
|---|---|---|---|
| CN | 111478593 A | 7/2020 |
| CN | 111884522 A | 11/2020 |
| EP | 3460977 A1 | 3/2019 |

* cited by examiner

CCM-BASED FLY-BACK SWITCHING POWER SUPPLY CIRCUIT AND CONTROL METHOD THEREOF

This invention is the National Stage Application of PCT/CN2020/138083, filed on Dec. 21, 2020, which claims the priority of the Chinese invention No. 202010827437.8 filed on Aug. 17, 2020, the content of which is incorporated into this invention by reference.

TECHNICAL FIELD

The present invention relates to a CCM-based fly-back switching power supply circuit and control method thereof, which belongs to the field of fly-back switching power supply control technology.

BACKGROUND OF THE INVENTION

Currently the fly-back switching power supply has two operating modes, discontinuous conduction mode (DCM) and continuous conduction mode (CCM). When the fly-back switching power supply works under DCM, the constant current output design is simple and easy to implement, because the current on the coil will drop to 0 at the end of each cycle, and its average current output formula is as follows:

$$I_{out\_ave} = \frac{1}{2} \times n \times I_{pk} \times \frac{Tsec}{T_{sw}},$$

in which, n is the turns ratio of the primary coil to the secondary coil of the transformer, Ipk is the primary coil peak current, Tsec is the conducting time of the secondary diode, Tsw is the power switch cycle. According to this formula, constant current output can be achieved by determining the values of the peak current and the ON-time duty cycle of the secondary coil. However, when the fly-back switching power supply works under CCM, the current in the coil would not be zero at the end of each cycle, so its average current output formula can be:

$$I_{out\_ave} = \frac{1}{2} \times n \times (I_{pk} + I1) \times \frac{Tsec}{T_{sw}},$$

in which, I1 is the initial current of the secondary coil when it is turned on. Since I1 varies in different periods, it is difficult to achieve a constant current output under CCM.

SUMMARY OF THE INVENTION

It is therefore an object of this invention to provide an easy-operated and efficient CCM-based fly-back switching power supply circuit and a control method thereof, which can output a constant current without specifying a constant value to the initial current of the secondary coil.

In accomplishing the above and other objects, there has been provided
  a CCM-based fly-back switching power supply circuit, comprising: a constant current control circuit, a sampling circuit and a peak current control circuit; wherein
  a sampling circuit configured to sample the ON-time of the secondary coil to obtain its duty cycle signal D_SEC, and send the signal to a constant current control circuit;
  a constant current control circuit configured to receive the duty cycle signal D_SEC, generate a voltage signal CAC from the duty cycle signal D_SEC and the preset reference voltage signal VREF, convert the voltage signal CAC and the peak current control signal VCST from the peak current control circuit into time signals, and perform a comparison on the time signals to output a adjustment signal CCOUT which is used to initiatively adjust the value of the peak current control signal VCST to cause the fly-back switching power supply circuit output a constant current.

Further, when the primary coil is turned on, the current detection resistor connected to the primary coil outputs a signal VCS, and the constant current control circuit comprises:
  a signal generating module used to generate a voltage signal CAC from the duty cycle signal D_SEC and the preset reference voltage signal VREF;
  a first timing module used to start or stop outputting a first time signal t1 when the voltage value of the CAC voltage signal is equal to that of the VCS signal;
  a second timing module used to output a second time signal t2;
  a timing comparing module used to compare the first time signal t1 with the second time signal t2, and determine whether to output the adjustment signal CCOUT to initiatively adjust the value of the peak current control signal VCST based on the comparison result, thereby making the fly-back switching power supply circuit output a constant current.

Furthermore, the constant current control circuit comprises: a delay module used to receive the adjustment signal CCOUT sent by the timing comparing module, and determine whether to output an overload protection signal PRO which is used to control the turn-off of a drive signal for the fly-back switching power supply circuit, by checking if the adjustment signal CCOUT is continuously at a high-level.

There also has been provided a CCM-based fly-back switching power supply control method, wherein the CCM-based fly-back switching power supply circuit of claim 1 is adopted. The method comprises the following steps:
  firstly, a sampling circuit samples the ON-time of the secondary coil to obtain the ON-time duty cycle signal D_SEC, and send the signal D_SEC to the constant current control circuit;
  secondly, a constant current control circuit receives the duty cycle signal D_SEC, then generates a voltage signal CAC from the duty cycle signal D_SEC and the preset reference voltage signal VREF;
  finally the constant current control circuit converts the voltage signal CAC and the peak current control signal VCST from the peak current control circuit into time signals, and performs the comparison on the time signals to output a adjustment signal CCOUT which is used to initiatively adjust the value of the peak current control signal VCST, thereby causing the fly-back switching power supply circuit output a constant current.

In addition, when the primary coil is turned on, the current detection resistor connected to the primary coil outputs a signal VCS; and the constant current control circuit comprises a signal generating module, a first timing module, a second timing module and a timing comparing module; wherein
  a signal generating module generates a voltage signal CAC from the duty cycle signal D_SEC and the preset reference voltage signal VREF;

when the primary coil is turned on, the first timing module and the second timing module start timing simultaneously to output a first timing signal t1 and a second timing signal t2, and the signal VCS rises;

when the voltage value of the signal VCS is equal to that of the voltage signal CAC, the first timing module stops timing;

when the primary coil in turned off, the second timing module stops timing, and the timing comparing module compares the first timing signal t1 with the second timing signal t2;

when the second timing signal t2 is greater than twice the first timing signal t1, the timing comparing module outputs a high-level adjustment signal CCOUT to control the peak current control circuit to decrease the value of the peak current control signal VCST, thereby causing the CCM-based fly-back switching power supply circuit output a constant current.

Additionally, when the primary coil is turned on, the current detection resistor connected to the primary coil outputs a signal VCS, and the constant current control circuit comprises: a signal generating module, a first timing module, a second timing module and a timing comparing module; wherein a signal generating module generates a voltage signal CAC from the duty cycle signal D_SEC and the preset reference voltage signal VREF;

when the primary coil is turned on, the second timing module starts timing to output a second timing signal t2, and the signal VCS rises;

when the voltage value of the VCS signal is equal to that of the CAC voltage signal, the first timing module starts timing to output a first timing signal t1;

when the primary coil is turned off, the first timing module and the second timing module stop timing, and the timing comparing module compares the first timing signal t1 with the second timing signal t2;

when the second timing signal t2 is less than twice the first timing signal t1, the timing comparing module outputs a high-level adjustment signal CCOUT to control the peak current control circuit to decrease the value of the peak current control signal VCST, thereby causing the CCM-based fly-back switching power supply circuit output a constant current.

Furthermore, when the second timing signal t2 is equal to twice the first timing signal t1, the average current output by the CCM-based fly-back switching power supply circuit is:

$$I_{out_{ave}} = n \times \frac{VREF}{RCS},$$

in which, RCS is the resistance value of the current detection resistor, and n is the turns ratio of the primary coil to the secondary coil.

Moreover, the constant current control circuit comprises a delay module. The delay module is used to receive the adjustment signal CCOUT sent by the timing comparing module, and determine whether to output an overload protection signal PRO which is used to control the turn-off of the drive signal for the fly-back switching power supply circuit, by checking if the adjustment signal CCOUT is continuously at a high-level.

The beneficial effects of this invention are: provided is an easy-operated and efficient CCM-based fly-back switching power supply circuit and a control method thereof, wherein a constant current control circuit is configured to receive the ON-time duty cycle signal D_SEC sent by the sampling circuit sampling the secondary coil, and then generate the CAC voltage signal from the signal D_SEC and the preset reference voltage signal VREF, so that the constant current control circuit can adjust the voltage value of the signal VCS to make the fly-back switching power supply circuit output a constant current.

The foregoing explanation is only an overview of the technical scheme of this invention. In order to better understand the technical means of this invention and implement it in accordance with the content of the specification, the following is a better implementation example of this invention together with the attached drawings for detailed explanation.

DETAILED DESCRIPTION OF THE INVENTION

Below are further described the specific implementation way of the present invention in conjunction with the drawings and examples. The following embodiments are used to clarify this invention but shall not limit the scope of this invention. The following embodiments are used to clarify this invention but shall not limit the scope of this invention.

Figure 1:
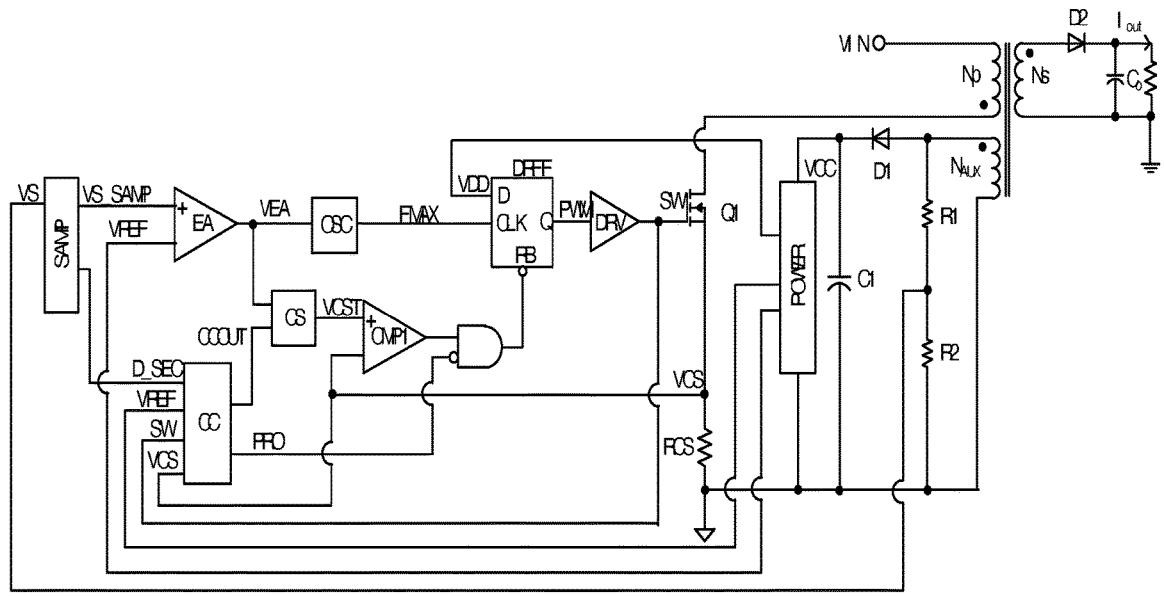
FIG. 1 shows a circuit diagram in accordance with one embodiment of the CCM-based fly-back switching power supply circuit in the present invention.

Referring to FIG. 1, it shows a CCM-based fly-back switching power supply circuit according to a preferred embodiment of the present invention, which includes a power supply circuit (POWER), a transformer connected to the power supply circuit, a sampling circuit (SAMP) for sampling the secondary coil of the transformer, a constant current control circuit (CC) and a driving circuit are connected to the sampling circuit, and a power transistor Q1 for controlling ON and OFF of the secondary coil. The transformer also includes a primary coil and an auxiliary coil, wherein the primary coil and the auxiliary coil are mutually inducted to the secondary coil, the secondary coil is connected to the secondary diode D2, the auxiliary coil is connected to the control circuit, and the primary coil is connected to the current detection resistor RCS and the source of the power transistor Q1.

The driving circuit includes a error amplifier (EA), a oscillation module (OSC), a peak current control module (CS), a comparator (CMP), a logic gate module, a data flip-flop (DRFF) and a driving module. When PWM=1, the power transistor Q1 is turned on, the primary coil is conducted, the current starts to flow into the resistor RCS, and the current increases with time, thereby making the VCS voltage rises with time; when the VCS voltage equals to the VCST voltage, and the current of the primary coil reaches its peak value; the comparator CMP generates a low-level signal to the logic gate circuit, the logic gate circuit outputs a low-level signal to the data flip-flop to reset it and causes it to output PWM=0, and then the power transistor Q1 is turned off, the secondary coil is turned on. The sampling circuit is used to sample the ON-time of the secondary coil to obtain the ON-time duty cycle signal D_SEC, and send it to the constant current control circuit. When the constant current control circuit receives the ON-time duty cycle signal D_SEC, it generate a voltage signal CAC from the duty cycle signal D_SEC and the preset reference voltage signal VREF, then converts the voltage signal CAC and the peak current control signal VCST from the peak current control circuit into time signals, and perform a comparison on the time signals to output a adjustment signal CCOUT. The adjustment signal CCOUT is used to initiatively adjust the value of the peak current control signal VCST, to cause the fly-back switching power supply circuit output a constant voltage or current until the next cycle PWM=1 when the power transistor Q1 is turned on again. In this embodiment, VCST is the peak current control voltage of the primary coil, D_SEC=TSEC/TSW, and CAC=VREF/D_SEC.

Specifically, the constant current control circuit includes a signal generating module 3, a first timing module 1, a second timing module 2 and a timing comparing module 4. The signal generating module 3 is used to generate a voltage signal CAC from the duty cycle signal D_SEC and the preset reference voltage signal VREF; and the first timing module is used to receive the signal CAC and the signal VCS. When the voltage value of the CAC voltage signal is equal to that of the VCS signal, the first timing module 1 starts or stops the output of a first time signal t1; the second timing module 2 starts to output the second time signal t2; the timing comparison module compares the first time signal t1 with the second time signal t2, and determines whether to output an adjustment signal CCOUT based on the comparison result, and thereby controlling the peak current control circuit to output a constant current.

The constant current control circuit also includes a delay module 5. The delay module receives the adjustment signal CCOUT sent by the timing comparing module, to output an overload protecting signal PRO. The overload protecting signal PRO is used to control the driving signal of the fly-back switching power supply circuit to be closed. Wherein, the logic gate module receives the signal PRO and output a low-level signal. The low-level signal of the logic gate module triggers the data flip-flop and drives the power transistor to turn off.

Figure 4:
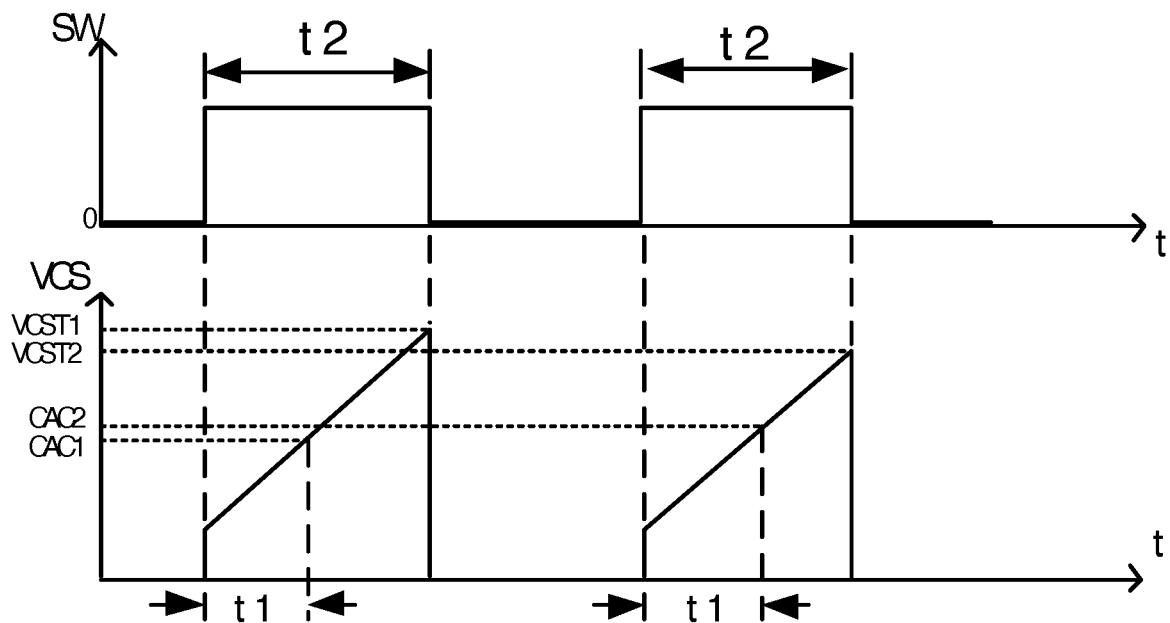
FIG. 4 shows an additional signal waveform diagram in accordance with one embodiment of the CCM-based flyback switching power supply circuit in the present invention.

Additionally, provided is a CCM-based fly-back switching power supply control method, which adopts the above-mentioned CCM-based fly-back switching power supply circuit. The method comprises the following steps:
firstly, a sampling circuit samples the ON-time of the secondary coil to obtain the ON-time duty cycle signal D_SEC, and send the signal D_SEC to the constant current control circuit;
secondly, a constant current control circuit receives the duty cycle signal D_SEC, then generate a voltage signal CAC from the duty cycle signal D_SEC and the preset reference voltage signal VREF;
finally, the constant current control circuit is controlled by the voltage signal CAC to output an adjustment signal CCOUT, and the adjustment signal CCOUT is used to initiatively adjust the value of the peak current control signal VCST, to cause the fly-back switching power supply circuit output a constant current.
Specifically, referring FIG. 2 and FIG. 4, when the primary coil is turned on, the signal generating module 3 generates a voltage signal CAC from the ON-time duty cycle signal D_SEC and the preset reference voltage signal VREF; the first timing module 1 and the second timing module 2 simultaneously start timing to output a first timing signal t1 and a second timing signal t2, meanwhile the signal VSC rises. When the voltage of the signal VCS is equal to that of the voltage signal CAC, the first timing module 1 stops timing; when the secondary coil is turned on, the second timing module 2 stops timing, and then the timing comparing module compares the first time signal t1 with the second time signal t2; When the second time signal t2 is greater than twice the first time signal t1, the timing comparing module outputs an adjustment signal CCOUT to control the peak current control signal VCST to decrease, thereby making the CCM-based fly-back switching power supply circuit output a constant current. That is, when t2>2×t1, the adjustment signal CCOUT controls the peak current control signal VCST to decrease, while t2<2×t1, the adjustment signal CCOUT will not work on the peak current control signal VCST, thereby keeping the peak current control signal VCST unchanged.

Figure 2:
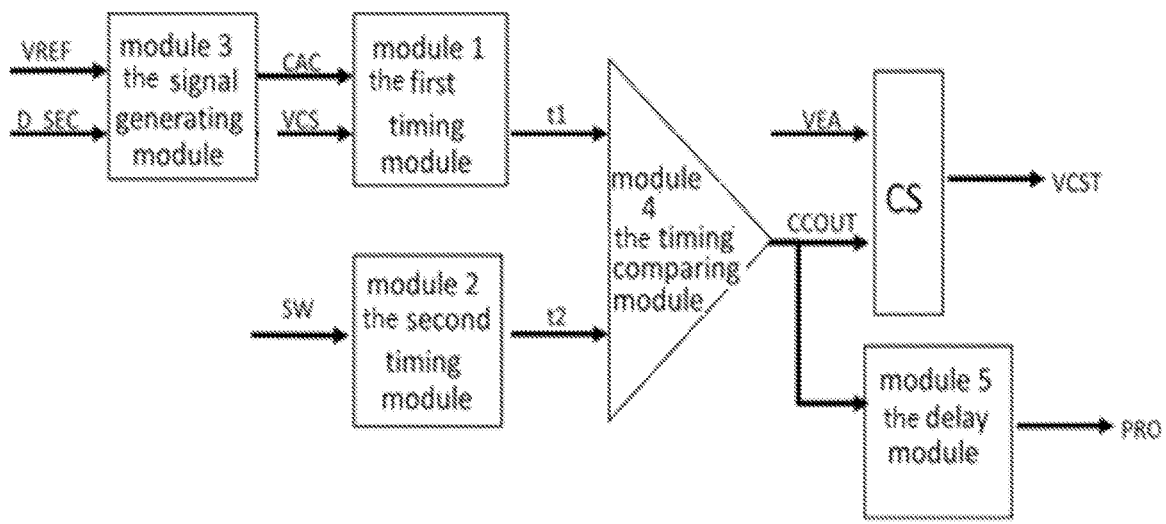
FIG. 2 shows a schematic diagram of some modules in FIG. 1.
Figure 3:
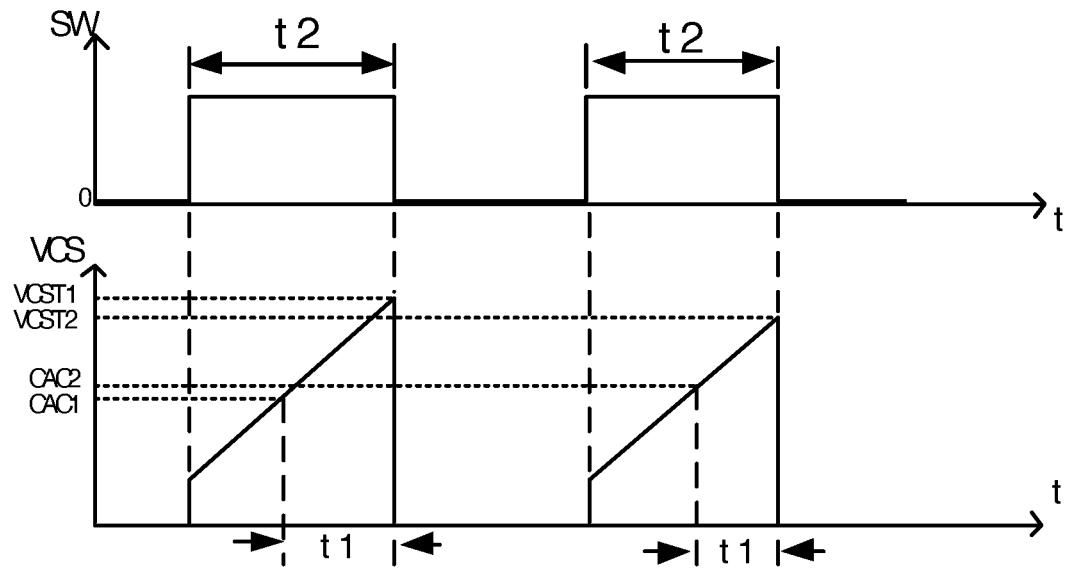
FIG. 3 shows a signal waveform diagram in accordance with one embodiment of the CCM-based fly-back switching power supply circuit in the present invention.

Referring FIG. 2 and FIG. 3, in one embodiment, the signal generating module 3 generates a voltage signal CAC from the ON-time duty cycle signal D_SEC and the preset reference voltage signal VREF; when the primary coil is conducted, the second timing module starts timing to output a second timing signal t2, and the signal VSC rises; when the voltage of the signal VCS is equal to that of the voltage signal CAC, the first timing module 1 starts timing to output a first timing signal t1; when the secondary coil is conducted, the first timing module 1 and the second timing module 2 stop timing, and then the timing comparing module compares the first time signal t1 with the second time signal t2; when the second time signal t2 is less than twice the first time signal t1, the timing comparing module outputs an adjustment signal CCOUT to control the peak current control signal VCST to decrease, thereby making the CCM-based fly-back switching power supply circuit output a constant current. That is, when t2<2×t1 the adjustment signal CCOUT controls the peak current control signal VCST to decrease, while t2>2×t1, the adjustment signal CCOUT will not work on the peak current control signal VCST, thereby keeping the peak current control signal VCST unchanged.

When the second time signal t2 is equal to twice the first time signal t1, the average output current of the CCM-based fly-back switching power supply circuit is:

$$I_{out_{ave}} = \frac{1}{2} \times n \times (I_{pk} + I1) \times \frac{Tsec}{T_{sw}} = n \times \frac{CAC}{RCS} \times \frac{Tsec}{T_{sw}} = n \times \frac{VREF}{RCS} \times \frac{1}{\frac{Tsec}{T_{sw}}} \times \frac{Tsec}{T_{sw}} = n \times \frac{VREF}{RCS}$$

wherein, RCS is the resistance value of the current detection resistor, and n is the turns ratio of the primary coil to the secondary coil.

According to the above formula, since the preset voltage VREF and RCS resistances are both constant, the output current is constant.

The constant current control circuit further comprises a delay module 5. The delay module 5 receives the adjustment signal CCOUT sent by the timing comparing module, and determines whether to output an overload protection signal PRO to control the fly-back switching power supply circuit drive signal to be turned off, by checking if the adjustment signal CCOUT is continuously at a high-level.

Specifically, as shown in FIG. 2, in one case, when the primary coil is turned on, that is, SW=1, the second timing module 2 starts timing, and the voltage value of the signal VCS keeps rising; when the voltage value of the signal VCS rises to the preset voltage value of the voltage signal CAC, the first timing module 1 starts timing; when SW=0, the first timing module 1 and the second timing module 2 stop timing simultaneously; and then the timing comparing module 4 compares the first time signal t1 with the second time signal t2. In another case, when the primary coil is turned on, that is, SW=1, the second timing module 2 starts timing, and the first timing module starts timing as well, meanwhile the voltage value of the signal VCS keeps rising; when the voltage value of the VCS signal rises to the preset voltage value of the voltage signal CAC, the first timing module 1 stops timing; when SW=0 the second timing module 2 stops timing; and then the timing comparing module 4 compares the first time signal t1 with the second time signal t2.

If the second time signal t2 is less than twice the first time signal t1, that is, t2<2×t1 in the first case, or if the second time signal t2 is greater than twice the first time signal t1, that is, t2>2×t1 in the second case, the timing comparing module 4 will output an adjustment signal CCOUT to the delay module 5; if the adjustment signal CCOUT is continuously at a high-level for multiple cycles, the delay module 5 will output a signal PRO to the logic gate module; when PRO=0, and the data flip-flop outputs PWM=0, the power transistor Q1 will be turned off, and then the switching power supply will be under protection.

In conclusion, provided is an easy-operated and efficient CCM-based fly-back switching power supply circuit and a control method thereof, wherein a constant current control circuit is configured to receive the ON-time duty cycle signal D_SEC sent by the sampling circuit sampling the secondary coil, generate the voltage signal CAC from the signal D_SEC and the preset reference voltage signal VREF; so as to adjust the voltage value of the signal VCST, thereby making the CCM-based fly-back switching power supply circuit output a constant current.

The technical features of the foregoing embodiments may be combined arbitrarily. For the sake of brevity, all possible combinations of the technical features of the foregoing embodiments are not described. However, as long as there is no contradiction in the combinations of these technical features, all shall be considered to be within the scope of this specification The foregoing description has been made on several embodiments of this invention which are relatively specific and detailed, however the invention is not limited thereto. It should be further understood by those skilled in the art that various changes and modifications may be made without departing from the spirit of the invention are protected by this invention. Therefore, the scope of protection for this invention shall be subject to the appended claims.

What is claimed is:

1. A CCM-based fly-back switching power supply circuit, comprising: a constant current control circuit, a sampling circuit and a peak current control circuit; wherein
    the sampling circuit configured to sample the ON-time of a secondary coil to obtain its duty cycle signal D_SEC, and send the duty cycle signal D_SEC to the constant current control circuit;
    the constant current control circuit configured to receive the duty cycle signal D_SEC, generate a voltage signal CAC from the duty cycle signal D_SEC and a preset reference voltage signal VREF, convert the voltage signal CAC and a peak current control signal VCST from the peak current control circuit into time signals, and perform a comparison on the time signals to output an adjustment signal CCOUT which is used to initiatively adjust the value of the peak current control signal VCST to cause the CCM-based fly-back switching power supply circuit output a constant current.

2. The CCM-based fly-back switching power supply circuit of claim 1, wherein when a primary coil is turned on, a current detection resistor connected to the primary coil outputs a signal VCS, and the constant current control circuit comprises:
    a signal generating module used to generate the voltage signal CAC from the duty cycle signal D_SEC and the preset reference voltage signal VREF;
    a first timing module used to start or stop outputting a first time signal t1 when the voltage value of the voltage signal CAC is equal to that of the signal VCS;
    a second timing module used to output a second time signal t2;
    a timing comparing module used to compare the first time signal t1 with the second time signal t2, and determine whether to output the adjustment signal CCOUT to initiatively adjust the value of the peak current control signal VCST based on a comparison result, thereby making the CCM-based fly-back switching power supply circuit output a constant current.

3. The CCM-based fly-back switching power supply circuit of claim 2, wherein the constant current control circuit further comprises:
    a delay module used to receive the adjustment signal CCOUT sent by the timing comparing module, and determine whether to output an overload protection signal PRO which is used to control the turn-off of a drive signal for the CCM-based fly-back switching power supply circuit, by checking if the adjustment signal CCOUT is continuously at a high-level.

4. A CCM-based fly-back switching power supply control method, wherein a CCM-based fly-back switching power supply circuit is adopted, the CCM-based fly-back switching power supply circuit comprising: a constant current control circuit, a sampling circuit and a peak current control circuit;
    the CCM-based fly-back switching power supply control method comprising:
    firstly, the sampling circuit samples the ON-time of a secondary coil to obtain a duty cycle signal D_SEC, and send the duty cycle signal D_SEC to the constant current control circuit;
    secondly, the constant current control circuit receives the duty cycle signal D_SEC, then generates a voltage signal CAC from the duty cycle signal D_SEC and a preset reference voltage signal VREF;
    finally, the constant current control circuit converts the voltage signal CAC and a peak current control signal VCST from the peak current control circuit into time signals, and performs a comparison on the time signals to output an adjustment signal CCOUT which is used to initiatively adjust the value of the peak current control signal VCST, thereby causing the fly-back switching power supply circuit output a constant current.

5. The method of claim 4, wherein when the primary coil is turned on, the current detection resistor connected to the primary coil outputs a signal VCS; and the constant current control circuit comprises a signal generating module, a first timing module, a second timing module and a timing comparing module; wherein a signal generating module generates the voltage signal CAC from the duty cycle signal D_SEC and the preset reference voltage signal VREF;

when the primary coil is turned on, the first timing module and the second timing module start timing simultaneously to output a first timing signal t1 and a second timing signal t2, and the signal VCS rises;

when the voltage value of the signal VCS is equal to that of the voltage signal CAC, the first timing module stops timing;

when the primary coil in turned off, the second timing module stops timing, and the timing comparing module compares the first timing signal t1 with the second timing signal t2;

when the second timing signal t2 is greater than twice the first timing signal t1, the timing comparing module outputs a high-level adjustment signal CCOUT to control the peak current control circuit to decrease the value of the peak current control signal VCST, thereby causing the CCM-based fly-back switching power supply circuit output a constant current.

6. The method of claim 5, wherein when the second timing signal t2 is equal to twice the first timing signal t1, the average current output by the CCM-based fly-back switching power supply circuit is:

$$I_{out_{ave}} = n \times \frac{VREF}{RCS},$$

in which, RCS is the resistance value of the current detection resistor, and n is the turns ratio of the primary coil to the secondary coil.

7. The method of claim 6, wherein the constant current control circuit further comprising:

a delay module used to receive the adjustment signal CCOUT sent by the timing comparing module, and determine whether to output an overload protection signal PRO which is used to control the turn-off of the drive signal for the CCM-based fly-back switching power supply circuit, by checking if the adjustment signal CCOUT is continuously at a high-level.

8. The method of claim 4, wherein when the primary coil is turned on, the current detection resistor connected to the primary coil outputs a signal VCS, and the constant current control circuit comprises; a signal generating module, a first timing module, a second timing module and a timing comparing module; wherein a signal generating module generates the voltage signal CAC from the duty cycle signal D_SEC and the preset reference voltage signal VREF;

when the primary coil is turned on, the second timing module starts timing to output a second timing signal t2, and the signal VCS rises;

when the voltage value of the VCS signal is equal to that of the CAC voltage signal, the first timing module starts timing to output a first timing signal t1;

when the primary coil is turned off, the first timing module and the second timing module stop timing, and the timing comparing module compares the first timing signal t1 with the second timing signal t2;

when the second timing signal t2 is less than twice the first timing signal t1, the timing comparing module outputs a high-level adjustment signal CCOUT to control the peak current control circuit to decrease the value of the peak current control signal VCST, thereby causing the CCM-based fly-back switching power supply circuit output a constant current.

* * * * *